United States Patent
Kuang et al.

(10) Patent No.: US 10,021,754 B2
(45) Date of Patent: Jul. 10, 2018

(54) TWO-CHANNEL LED DRIVER WITH SHORT CIRCUIT PROTECTION AND SHORT CIRCUIT PROTECTION METHOD FOR TWO-CHANNEL LED DRIVER

(71) Applicant: Chengdu Monolithic Power Systems Co., Ltd., Chengdu (CN)

(72) Inventors: Naixing Kuang, Hangzhou (CN); Kai Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/805,064

(22) Filed: Nov. 6, 2017

(65) Prior Publication Data
US 2018/0132313 A1   May 10, 2018

(30) Foreign Application Priority Data
Nov. 8, 2016 (CN) .......................... 2016 1 0979538

(51) Int. Cl.
*H05B 33/08* (2006.01)
*H05B 37/02* (2006.01)

(52) U.S. Cl.
CPC ....... *H05B 33/089* (2013.01); *H05B 33/0809* (2013.01); *H05B 33/0827* (2013.01); *H05B 33/0845* (2013.01)

(58) Field of Classification Search
None
See application file for complete search history.

(56) References Cited

U.S. PATENT DOCUMENTS

| | | |
|---|---|---|
| 8,503,139 B2 | 8/2013 | Yao et al. |
| 8,896,214 B2 | 11/2014 | Xu |
| 9,661,700 B2 | 5/2017 | Kuang et al. |

OTHER PUBLICATIONS

U.S. Appl. No. 15/629,623, filed Jun. 21, 2017, Chengdu Monolithic Power Systems.
U.S. Appl. No. 15/629,675, filed Jun. 21, 2017, Chengdu Monolithic Power Systems.

*Primary Examiner* — Dedei K Hammond
(74) *Attorney, Agent, or Firm* — Perkins Coie LLP (57) ABSTRACT

A two-channel LED driver with short circuit protection is discussed. A short process circuit monitors a short condition of the LED driver, and locks the short status if short circuit occurs at either one of or both of the channels.

20 Claims, 7 Drawing Sheets

Figure 8

TWO-CHANNEL LED DRIVER WITH SHORT CIRCUIT PROTECTION AND SHORT CIRCUIT PROTECTION METHOD FOR TWO-CHANNEL LED DRIVER

CROSS-REFERENCE TO RELATED APPLICATIONS

This application claims priority to and the benefit of Chinese Patent Application No. 201610979538.0, filed Nov. 8, 2016, which is incorporated herein by reference in its entirety.

FIELD

The present invention relates to electronic circuits, more specifically, the present invention relates to two-channel LED drivers with short circuit protection.

BACKGROUND

As the development of technology, conventional fluorescent lamps are gradually replaced by LEDs (light emitting diodes) in applications such as LCD backlighting and lighting. In the application of smart LED lighting, a driver is needed to provide a controllable current. Different power supply voltages, such as 3.3V, 5V etc. are also needed to power smart modules (e.g. microcontroller unit (MCU), wireless module R/F, etc.) at different situations.

Conventional two-channel LED drivers typically adopt two power stages: a first stage including a converter (e.g. a flyback converter) to provide two constant voltages, with one voltage driving the LEDs, and the other voltage powering other modules; and a second stage including two step-down converters, to control the current flowing through the LEDs in the two channels, respectively. If one of the LED channels is short, conventional LED driver would shut down the corresponding power stage, to stop supplying power to the open channel.

Monolithic Power Systems Inc. (MPS) provides a different solution for driving two-channel LEDs. It adopts only one power stage, to both drive the two-channels and to power a wireless module. Two dimming signals are provided by the wireless module, with one dimming signal controlling the total luminance of the two-channel LEDs, while the other dimming signal controlling the dimming ratio between the two channels. If one of the channels is short, or both of the two channels are short, how to detect this short condition, and further how to protect the system is a challenge.

SUMMARY

It is an object of the present invention to provide a two-channel LED driver, which resolves above problems.

In accomplishing the above and other objects, there has been provided, in accordance with an embodiment of the present invention, a two-channel LED driver, comprising: a power converter, configured to provide a first drive voltage and a second drive voltage, to respectively drive a first channel LED and a second channel LED in response to an input voltage, the power converter including a main power switch, the first channel LED being dimmed by a first dimming switch, the second channel LED being dimmed by a second dimming switch, the first dimming switch and the second dimming switch being both controlled by a second dimming signal, and the second dimming switch being controlled to be turned on and off complementary with the first dimming switch; a power control circuit, configured to generate a control signal to control the main power switch in response to a first dimming signal and a current sense signal indicative of a current flowing through the main power switch; and a short process circuit, configured to monitor a short condition of the first channel LED and the second channel LED, wherein if one of the channels is shorted, the short process circuit is configured to control the corresponding dimming switch of the shorted channel LED to be kept ON.

In addition, there has been provided, in accordance with an embodiment of the present invention, a short circuit protection method for a two-channel LED driver, comprising: generating a first drive voltage and a second drive voltage to respectively drive a first channel LED and a second channel LED in response to an input voltage; controlling a total current flowing through the first channel LED and the second channel LED according to a first dimming signal; and monitoring a short circuit condition of the first channel LED and the second channel LED: 1) locking the short status of the corresponding channel if one of the channels is short; and 2) controlling a dimming ratio of the first channel LED and the second channel LED according to a second dimming signal if none of the channels is short.

Furthermore, there has been provided, in accordance with an embodiment of the present invention, a two-channel LED driver, comprising: a power converter, configured to provide a first drive voltage and a second drive voltage, to respectively drive a first channel LED and a second channel LED in response to an input voltage, the power converter including a main power switch; a power control circuit, configured to generate a control signal to control the main power switch in response to a first dimming signal and a current sense signal indicative of a current flowing through the main power switch; and a short process circuit, configured to monitor a short condition of the first channel LED and the second channel LED, wherein if one of the channels is shorted, the short process circuit is configured to lock the short status of the shorted channel LED.

DETAILED DESCRIPTION

Embodiments of circuits for two-channel LED driver with short circuit protection are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
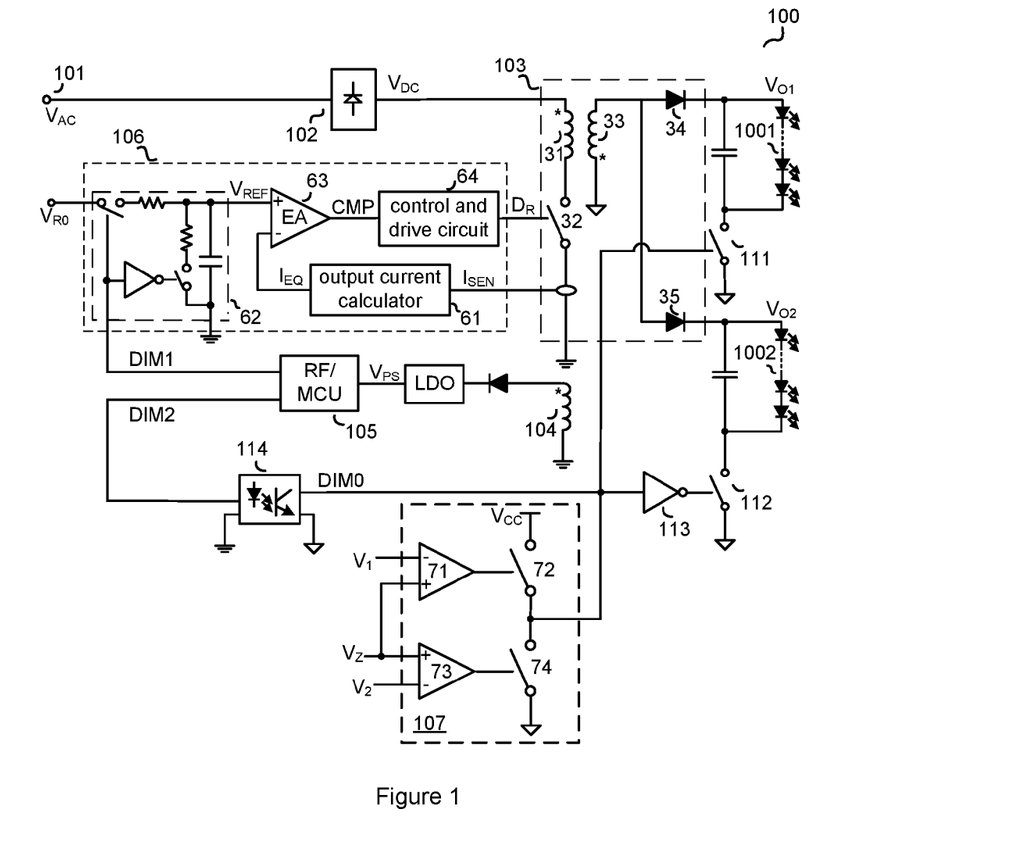
FIG. 1 schematically shows a two-channel LED driver 100 in accordance with an embodiment of the present invention.

FIG. 1 schematically shows a two-channel LED driver 100 in accordance with an embodiment of the present invention. The so-called two-channel in the present invention means that two LEDs and/or two LED strings are coupled to the driver in parallel. In the example of FIG. 1, the two-channel LED driver 100 is operable to drive a first channel LED 1001 and a second channel LED 1002, and the two-channel LED driver 100 comprises: an input port 101, configured to receive an AC input voltage $V_{AC}$; a rectifier 102, configured to receive the AC input voltage $V_{AC}$ to provide a rectified signal $V_{DC}$; a power converter 103, configured to provide a first drive voltage $V_{O1}$ and a second drive voltage $V_{O2}$, to respectively provide a drive current to the first channel LED 1001 and the second channel LED 1002, the power converter 103 including a first winding 31 and a main power switch 32 coupled to the first winding 31, wherein the first winding 31 is configured to store energy when the main power switch 32 is ON, and is configured to release the energy to the first and second channels when the main power switch 32 is OFF; a second winding 104, magnetically coupled to the first winding 31 to provide a power supply voltage $V_{PS}$ to power a wireless control module (RF/MCU) 105; a power control circuit 106, configured to receive a first dimming signal DIM1 and a current sense signal $I_{SEN}$ indicative of a current flowing through the main power switch 32, to generate a control signal Dr to control the main power switch 32, the first dimming signal DIM1 is provided by the wireless control module (RF/MCU) 105; a first dimming switch 111, coupled to the first channel LED 1001, to dim the first channel LED 1001; a second dimming switch 112, coupled to the second channel LED 1002, to dim the second channel LED 1002, wherein the first dimming switch 111 and the second dimming switch 112 are both controlled by the second dimming signal DIM2, and the second dimming switch 112 is controlled to be turned on and off complementary with the first dimming switch 111; and a short process circuit 107, configured to monitor a short condition of the first channel LED 1001 and the second channel LED 1002, wherein if one of the channels is shorted, the short process circuit 107 is configured to control the corresponding dimming switch of the shorted channel LED to be kept ON, i.e., to lock the ON status of the corresponding dimming switch.

In one embodiment, when the power converter adopts isolated topology (e.g., the flyback converter as shown in FIG. 1), the second dimming signal DIM2 is delivered to the secondary side by way of a photoelectric coupler 114. Because of the existence of the photoelectric coupler 114, the second dimming signal DIM2 is inverted as an inverted signal DIM0, which is used to control the first dimming switch 111 and the second dimming switch 112. In some other embodiments, the power converter may adopt non-isolated topology, and no photoelectric coupler is needed, which will be further discussed in the embodiment of FIG. 6.

In one embodiment, the short process circuit 107 is configured to monitor and handle the short circuit condition based on the first drive voltage $V_{O1}$ and the second drive voltage $V_{O2}$.

In the example of FIG. 1, the short process circuit 107 comprises: a first comparing circuit 71, configured to receive a first voltage signal $V_1$ indicative of the first drive voltage $V_{O1}$ and a zero reference voltage $V_Z$, wherein the first comparing circuit 71 is operable to compare the first voltage signal $V_1$ with the zero reference voltage $V_Z$, when the first voltage signal $V_1$ is lower than the zero reference voltage $V_Z$, a first connect switch 72 is turned on to pull high a control signal (e.g. the inverted signal DIM0) of the first dimming switch 111, so that the first dimming switch 111 is kept ON, and the second dimming switch 112 is kept OFF; and a second comparing circuit 73, configured to receive a second voltage signal $V_2$ indicative of the second drive voltage $V_{O2}$ and the zero reference voltage $V_Z$, wherein the second comparing circuit 73 is operable to compare the second voltage signal $V_2$ with the zero reference voltage $V_Z$, when the second voltage signal $V_2$ is lower than the zero reference voltage $V_Z$, a second connect switch 74 is turned on, to pull low the control signal (e.g. the inverted signal DIM0) of the first dimming switch 111, so that the first dimming switch 111 is kept OFF, and the second dimming switch 112 is kept ON.

In one embodiment, the first dimming signal DIM1 and the second dimming signal DIM2 are both PWM (pulse width modulation) signals.

In one embodiment, the power control circuit 106 comprises: an output current calculator 61, configured to calculate a total current flowing through the first channel LED 1001 and the second channel LED 1002 based on the current sense signal $I_{SEN}$, to generate an equivalent output current $I_{EQ}$; a reference signal generator 62, configured to receive the first dimming signal DIM1, to generate a reference signal $V_{REF}$ controlled by the first dimming signal DIM1; an error amplifier (EA) 63, configured to receive the reference signal $V_{REF}$ and the equivalent output current $I_{EQ}$, to generate a compensation signal CMP by amplifying and integrating a difference between the reference signal $V_{REF}$ and the equivalent output current $I_{EQ}$; and a control and drive circuit 64, configured to receive the compensation signal CMP to generate a control signal Dr to control the main power switch 32. In one embodiment, the reference signal generator 62 is configured to receive an original reference voltage $V_{RO}$ and the first dimming signal DIM1, and to generate the reference signal $V_{REF}$ by multiplying the original reference voltage $V_{RO}$ with a duty cycle of the first dimming signal DIM1, i.e., the reference signal $V_{REF}$, the original reference voltage $V_{RO}$ and the duty cycle of the first dimming signal DIM1 have a relationship as:

$$V_{REF} = V_{RO} \times D_{DIM1}$$

wherein $D_{DIM1}$ represents the duty cycle of the first dimming signal DIM1.

In one embodiment, the power converter 103 further comprises: a secondary winding 33, magnetically coupled to the first winding 31; a first secondary power switch 34, coupled between the secondary winding 33 and the first channel LED 1001; a second secondary power switch 35, coupled between the secondary winding 33 and the second channel LED 1002; and an inverter 113, configured to receive the inverted signal DIM0 (the inverted signal of the second dimming signal DIM2) to generate its inverted signal.

In one embodiment, the wireless control module 105 is powered by the power supply voltage $V_{PS}$ at the second winding 104 by way of a diode and a voltage regulator (e.g. a low dropout regulator, LDO). However, one skilled in the art should realize that, the voltage regulator may comprise other appropriate circuits.

During the operation of the system, if the first channel LED 1001 is short, when the corresponding dimming switch (i.e., the first dimming switch 111) is turned on, the corresponding drive voltage (the first drive voltage $V_{O1}$) is pulled low, causing the first voltage signal $V_1$ to be lower than the zero reference voltage $V_Z$. This short situation would be detected by the first comparing circuit 71. Then the first connect switch 72 would be turned on, which pulls high the inverted signal DIM0. Accordingly, the first dimming switch 111 is kept ON, and the second dimming switch 112 is kept OFF. As a result, the short status of the first channel LED 1001 is locked, which would trigger short circuit protection later. Similarly, if the second channel LED 1002 is short, when the corresponding dimming switch (i.e., the second dimming switch 112) is turned on, the corresponding drive voltage (the second drive voltage $V_{O2}$) is pulled low, causing the second voltage signal $V_2$ to be lower than the zero reference voltage $V_Z$. This short situation would be detected by the second comparing circuit 73. Then the second connect switch 74 would be turned on, which pulls low the inverted signal DIM0. Accordingly, the second dimming switch 112 is kept ON, and the first dimming switch 111 is kept OFF. As a result, the short status of the second channel LED 1002 is locked, which would trigger short circuit protection later. If both of the two channels are short, when one of the dimming switches (e.g. the first dimming switch 111) is turned on, the first drive voltage $V_{O1}$ is pulled low. Accordingly, the first connect switch 72 is turned on by the first comparing circuit 71, to keep the first dimming switch 111 to be ON. Then the short status of the first channel LED 1001 is locked, which would trigger short circuit protection later.

In one embodiment, actions to execute short circuit protection may comprise shutting down the whole system. In another embodiment, the action may comprise providing a small power to start a new switching cycle after a long time period since the short status has been locked (in reference with FIG. 7 and related description below).

Figure 2:
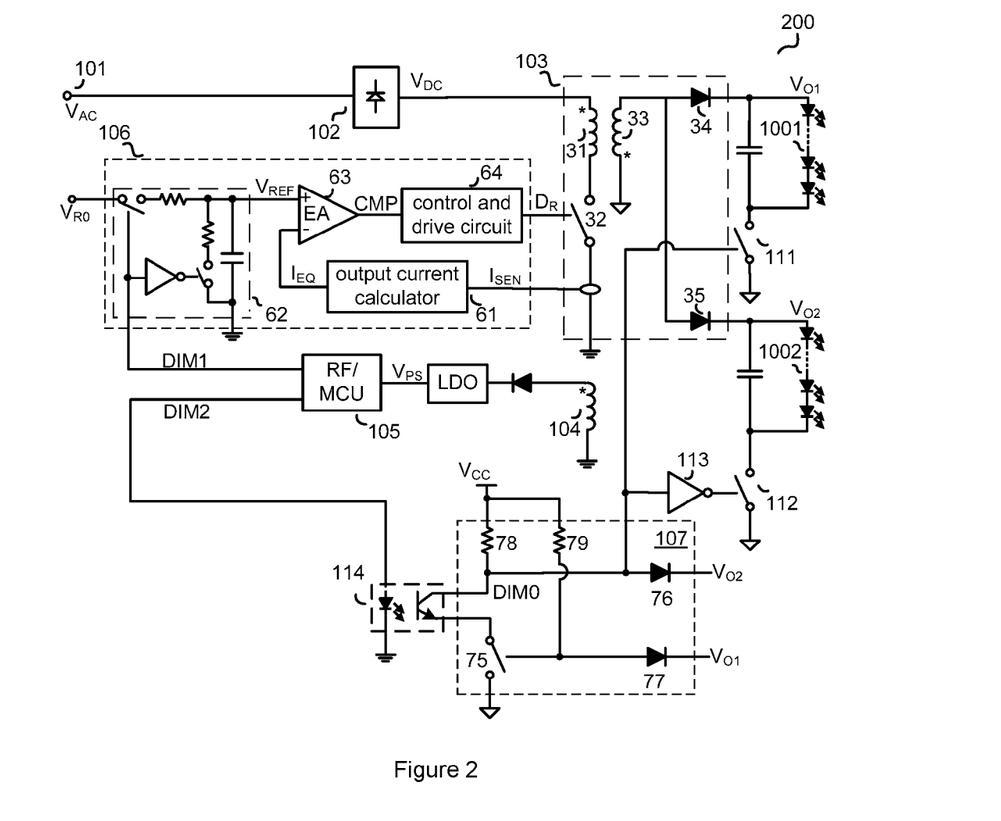
FIG. 2 schematically shows a two-channel LED driver 200 in accordance with an embodiment of the present invention.

FIG. 2 schematically shows a two-channel LED driver 200 in accordance with an embodiment of the present invention. The two-channel LED driver 200 in FIG. 2 is similar to the two-channel LED driver 100 in FIG. 1, with a difference that the two-channel LED driver 200 in FIG. 2 specifically shows the coupling manner of the photoelectric coupler 114 with other circuits. As shown in FIG. 2, the photoelectric coupler 114 comprises a light emitting diode part and a triode part, wherein the light emitting diode part is configured to receive the second dimming signal DIM2 from the wireless control module 105, and the triode part is configured to provide the inverted signal DIM0, which controls the ON and OFF of the first and second dimming switches.

In the example of FIG. 2, the short process circuit 107 comprises: a grounding switch 75, wherein a first terminal of the triode part of the photoelectric coupler 114 is coupled to a reference ground by way of the grounding switch 75; a first diode 76, wherein a second terminal of the triode part of the photoelectric coupler 114 is coupled to one of the drive voltages (e.g. the second drive voltage $V_{O2}$) by way of the first diode 76; and a second diode 77, wherein the other one of the drive voltages (e.g. the first drive voltage $V_{O1}$) is configured to control the grounding switch 75 by way of the second diode 77; wherein the inverted signal DIM0 is provided at the second terminal of the triode part of the photoelectric coupler 114.

In the example of FIG. 2, the short process circuit 107 further comprises: a first impendence 78, wherein the second terminal of the triode part of the photoelectric coupler 114 is coupled to a power supply $V_{CC}$ by way of the first impendence 78; and a second impendence 79, wherein a control terminal of the grounding switch 75 is coupled to the power supply $V_{CC}$ by way of the second impendence 79. In one embodiment, the first impendence 78 and the second impendence 79 each comprises a resistor.

During the operation of the system, if the first channel LED 1001 is short, when the corresponding dimming switch (i.e. the first dimming switch 111) is turned on, the corresponding drive voltage (i.e. the first drive voltage $V_{O1}$) is pulled low. Then the grounding switch 75 is turned off, and the inverted signal DIM0 would be pulled high by way of the first impendence 78, so that the first dimming switch 111 is kept ON, and the second dimming switch 112 is kept OFF. Accordingly, the short status of the first channel LED 1001 is locked, which would trigger short circuit protection later. Similarly, if the second channel LED 1002 is short, when the corresponding dimming switch (i.e. the second dimming switch 112) is turned on, the corresponding drive voltage (i.e. the second drive voltage $V_{O2}$) is pulled low. The inverted signal DIM0 would also be pulled low by way of the first diode 76, so that the first dimming switch 111 is kept OFF, and the second dimming switch 112 is kept ON. Accordingly, the short status of the second channel LED 1002 is locked, which would trigger short circuit protection later. If both of the two channels are short, when one of the dimming switches (e.g. the first dimming switch 111) is turned on, the corresponding drive voltage (i.e., the first drive voltage $V_{O1}$) is pulled low. As discussed above, the grounding switch 75 is turned off, and the inverted signal DIM0 is pulled high, causing the first dimming switch 111 to be kept ON. Then the short status of the first channel LED 1001 is locked, which would trigger short circuit protection later. That is, in the example of FIG. 2 the short process circuit 107 comprises: a first diode 76, configured to receive one of the drive voltages (e.g. $V_{O2}$), and to pull low a control signal (e.g. the inverted signal DIM0) if the drive voltage (e.g. $V_{O2}$) received at the first diode 76 is low; and a second diode 77, configured to receive the other one of the drive voltages (e.g. $V_{O1}$), and to pull high the control signal (e.g. the inverted signal DIM0) if the drive voltage (e.g. $V_{O1}$) received at the second diode 77 is low; wherein the first dimming switch 111 and the second dimming switch 112 is controlled by the control signal.

Figure 3:
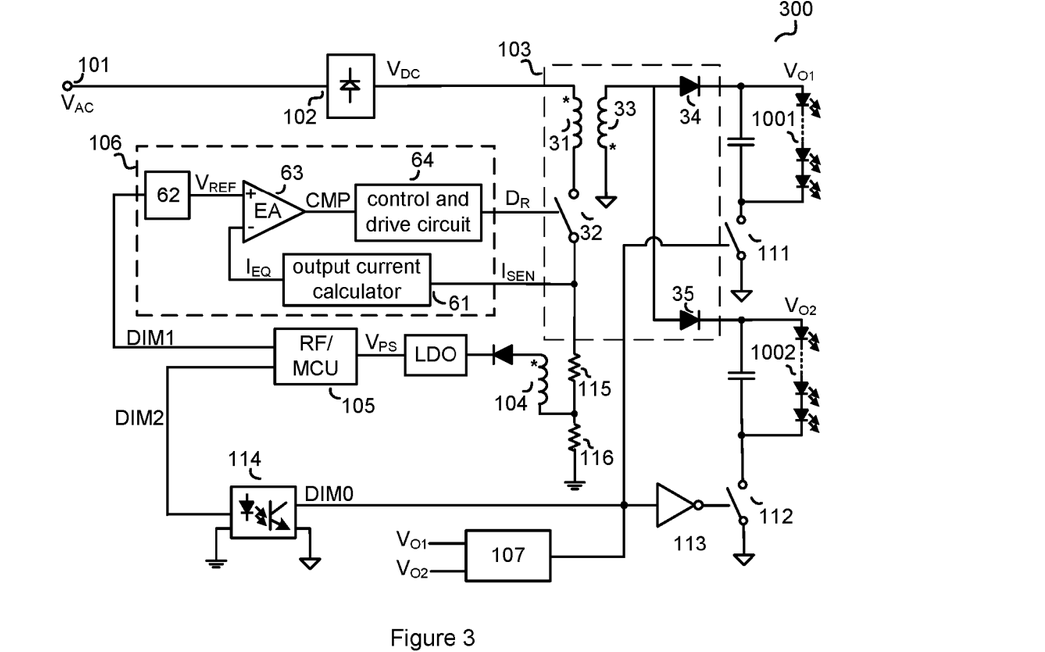
FIG. 3 schematically shows a two-channel LED driver 300 in accordance with an embodiment of the present invention.

FIG. 3 schematically shows a two-channel LED driver 300 in accordance with an embodiment of the present invention. The two-channel LED driver 300 in FIG. 3 is similar to the two-channel LED driver 100 in FIG. 1, with a difference that the two-channel LED driver 300 in FIG. 3 specifically shows coupling manners of the second winding 104 with the main power switch 32, and the output current calculator 61 with the main power switch 32. Specifically, the two-channel LED driver 300 in FIG. 3 further comprises: a first resistor 115 and a second resistor 116, series coupled between the main power switch 32 and a primary reference ground, wherein a voltage across the two series coupled resistors (115 & 116) is the current sense signal $I_{SEN}$, and wherein the second winding 104 is coupled to the reference ground/primary reference ground by way of the second resistor 116. The voltage across the two series coupled resistors (115 & 116) is then converted to the equivalent output current $I_{EQ}$ which reflects the total current flowing through the first channel LED 1001 and the second channel LED 1002 by way of the output current calculator 61.

During the operation of the system, when the main power switch 32 is turned off, the current flowing through the main power switch 32 is zero; and when the main power switch 32 is turned on, the current flowing through the main power switch 32 is:

$$I_{32} = I_{LM} + \frac{N2}{N1} \times I_{104} \quad (1)$$

wherein $I_{32}$ represents the current flowing through the main power switch 32, $I_{Lm}$ represents the current flowing through a magnetization inductor of the first winding 31, $I_{104}$ represents the current flowing through the second winding 104, and N2/N1 is the turn ratio between the second winding 104 and the first winding 31.

Thus, the voltage across the two series coupled resistors (i.e. the current sense signal $I_{SEN}$) is:

$$I_{SEN} = I_{32} \times (R_{115} + R_{116}) - I_{104} \times R_{116} \quad (2)$$

wherein $R_{115}$ represents the resistance of the first resistor 115, and $R_{116}$ represents the resistance of the second resistor 116.

According to equation (1) and equation (2), the current sense signal $I_{SEN}$ is:

$$I_{SEN} = I_{Lm} \times (R_{115} + R_{116}) + I_{104} \times \left[ \frac{N2}{N1} \times R_{115} - \left(1 - \frac{N2}{N1}\right) \times R_{116} \right]$$

As a result, if the relationship of the turn ratio between the second winding 104 and the first winding 31, and the resistances of the first resistor 115 and the second resistor 116 is set as:

$$\frac{N2}{N1} \times R_{115} = \left(1 - \frac{N2}{N1}\right) \times R_{116} \quad (3)$$

Then $$I_{SEN} = I_{Lm} \times (R_{115} + R_{116}) \quad (4)$$

As can be seen from equations (3) and (4), if the relationship of the turn ratio between the second winding 104 and the first winding 31, and the resistances of the first resistor 115 and the second resistor 116 is particularly set as equation (3), the current sense signal $I_{SEN}$ is only related to the current flowing through the magnetization inductor of the first winding 31, but not affected by the current flowing through the second winding 104. The current sense signal $I_{SEN}$ is then converted to the equivalent output current $I_{EQ}$, so as to accurately reflect the total current flowing through the first channel LED 1001 and the second channel LED 1002.

The other circuit configuration and the operation principle of the two-channel LED driver 300 in FIG. 3 are similar to the two-channel LED drivers 100 & 200 in FIGS. 1 & 2.

Figure 4:
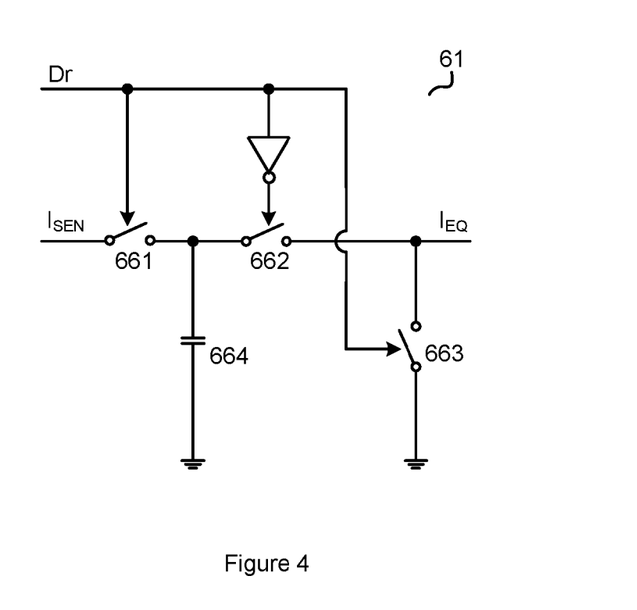
FIG. 4 schematically shows a circuit configuration of the output current calculator 61 in accordance with an embodiment of the present invention.

FIG. 4 schematically shows a circuit configuration of the output current calculator 61 in accordance with an embodiment of the present invention. In the example of FIG. 4, the output current calculator 61 comprises: switches 661-663 and a capacitor 664, wherein the operations of the switches 661-663 are all related to the control signal Dr. When the main power switch 32 is ON, the switches 661 and 663 are ON, and the switch 662 is OFF. Accordingly, the equivalent output current $I_{EQ}$ is zero; and a voltage across the capacitor 664 is the current sense signal $I_{SEN}$. When the main power switch 32 is OFF, the switches 661 and 663 are OFF, and the switch 662 is ON. Accordingly, the equivalent output current $I_{EQ}$ is the voltage across the capacitor 664, which is equal to a peak value of the current sense signal $I_{SEN}$.

The equivalent output current $I_{EQ}$ is then delivered to the error amplifier 63, so that the equivalent output current $I_{EQ}$ is regulated to the reference signal $V_{REF}$, which is controlled by the first dimming signal DIM1. Thus, the total current flowing through the first channel LED and the second channel LED (i.e. the total brightness of the LED) is regulated by the first dimming signal DIM1 in the two-channel LED drivers 100, 200 and 300.

As discussed above, the first dimming switch 111 and the second dimming switch 112 are controlled by the second dimming signal DIM2, and the first dimming switch 111 and the second dimming switch 112 are turned on and off complementary (i.e. the first channel LED 1001 and the second channel LED 1002 are lighted complementary), so the second dimming signal DIM2 regulates the dimming ratio of each channel. For example, if the second dimming signal DIM2 has a duty cycle of 40%, after the conversion of the photoelectric coupler 114, the first channel LED 1001 will have a dimming ratio of 60%, and the second channel LED 1002 will have a dimming ratio of 40%. That is, in one switching cycle, the light time of the first channel LED 1001 occupies 60%, and the light time of the second channel LED 1002 occupies 40%.

Figure 5:
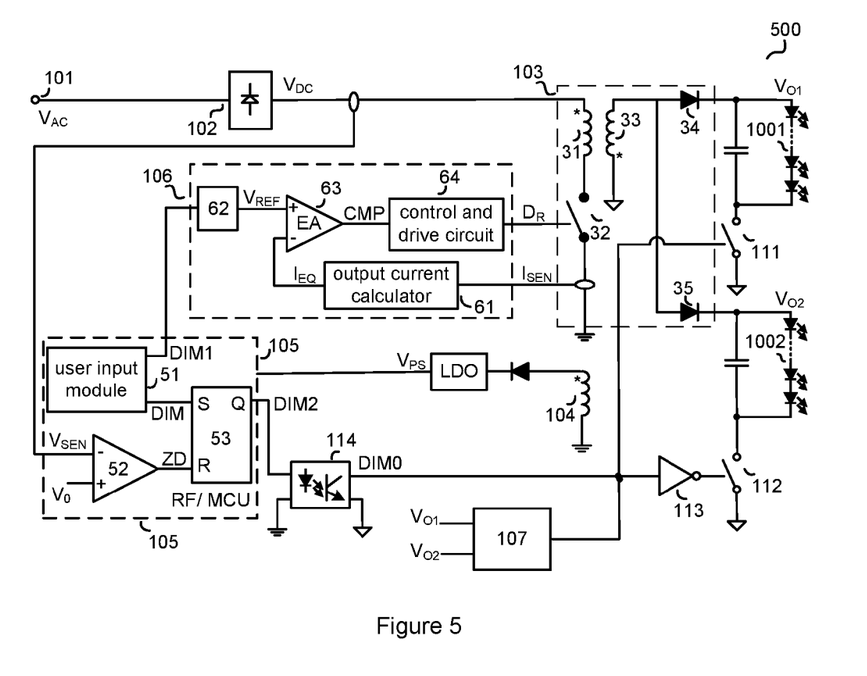
FIG. 5 schematically shows a two-channel LED driver 500 in accordance with an embodiment of the present invention.

FIG. 5 schematically shows a two-channel LED driver 500 in accordance with an embodiment of the present invention. The two-channel LED driver 500 in FIG. 5 is similar to the two-channel LED driver 100 in FIG. 1, with a difference that in the example of FIG. 5, the second dimming signal DIM2 is synchronized with the AC input voltage $V_{AC}$ (or the rectified signal $V_{DC}$) by the wireless control module (RF/MCU) 105. Specifically, the wireless control module 105 comprises: a user input module 51, configured to provide the first dimming signal DIM1 and a regulate signal DIM; a zero comparator 52, configured to receive an input sense signal $V_{SEN}$ indicative of the AC input voltage $V_{AC}$ (or indicative of the rectified signal $V_{DC}$) and a zero voltage reference signal $V_0$ (e.g. 0.1V), wherein the zero comparator 52 is configured to generate a zero detecting signal ZD by comparing the input sense signal $V_{SEN}$ with the zero voltage reference signal $V_0$, a flip-flop 53, configured to receive the regulate signal DIM and the zero detecting signal ZD, to generate the second dimming signal DIM2, wherein the second dimming signal DIM2 is set in response to the regulate signal DIM, and is reset in response to the zero detecting signal ZD, and wherein the reset has priority.

The other circuit configuration and the operation principle of the two-channel LED driver 500 in FIG. 5 are similar to the two-channel LED drivers discussed hereinbefore.

Several embodiments of the foregoing two-channel LED drivers (100, 200, 300 & 500) adopt an isolated power converter. However, one with ordinary skill in the art should realize that the power converter in the two-channel LED driver may also adopt a non-isolated power converter, as shown in FIG. 6.

Figure 6:
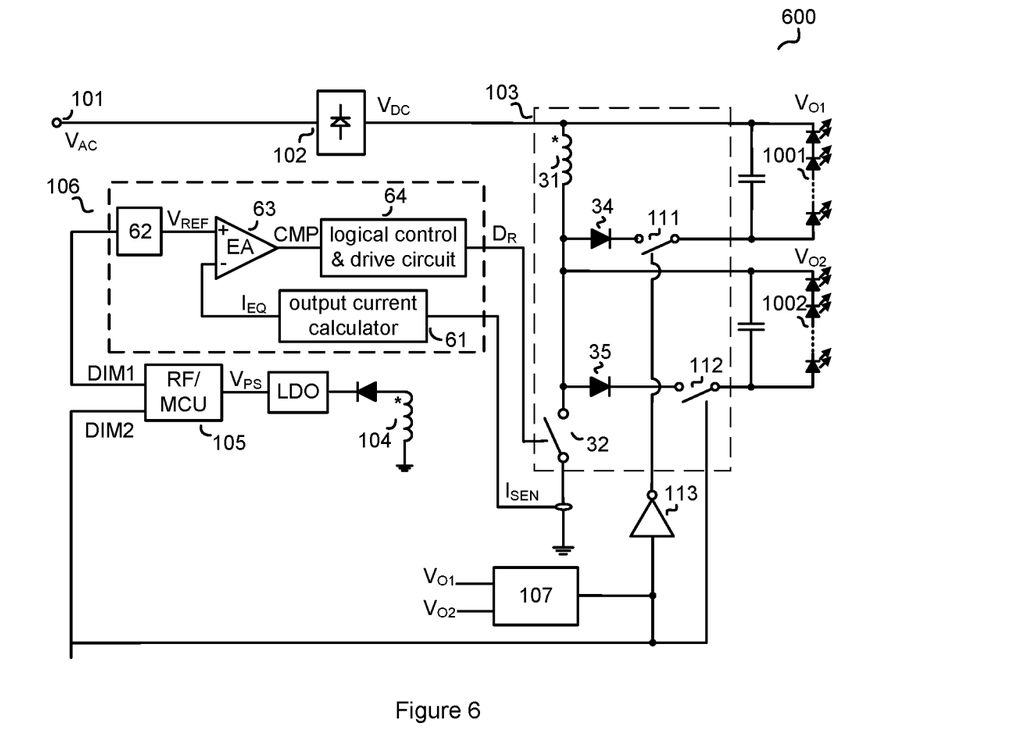
FIG. 6 schematically shows a two-channel LED driver 600 in accordance with an embodiment of the present invention.

FIG. 6 schematically shows a two-channel LED driver 600 in accordance with an embodiment of the present invention. In the example of FIG. 6, the power converter 103 in the two-channel LED driver 600 comprises a buck-boost converter. Specifically, the buck-boost converter comprises: a first winding 31; a main power switch 32, coupled to the first winding 31, wherein the first winding 31 is configured to store energy when the main power switch 32 is ON and is configured to release the energy to the first channel LED 1001 and second channel LED 1002 when the main power switch 32 is OFF; a first secondary power switch 34, coupled to the first winding 31 and the main power switch 32; and a second secondary power switch 35, coupled to the first winding 31 and the main power switch 32.

In the example of FIG. 6, the buck-boost converter is adopted, so the first dimming switch 111 and the second dimming switch 112 are configured as high-side switches, and floating drives are needed. However, in some other embodiment, the power converter 103 may adopt other topologies, and the first dimming switch 111 and the second dimming switch 112 may be configured as low-side switches.

The other circuit configuration and the operation principle of the two-channel LED driver 600 in FIG. 6 are similar to the two-channel LED drivers discussed hereinbefore.

Figure 7:
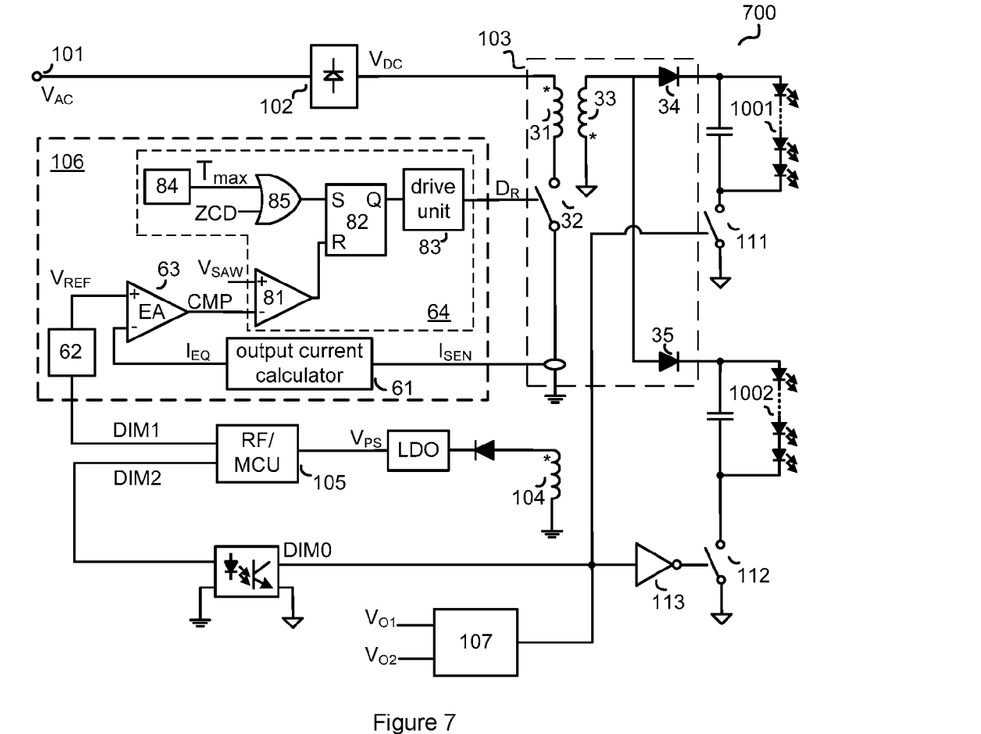
FIG. 7 schematically shows a two-channel LED driver 700 with a circuit configuration of the control and drive circuit 64 in accordance with an embodiment of the present invention.

FIG. 7 schematically shows the two-channel LED driver 700 with a circuit configuration of the control and drive circuit 64 in accordance with an embodiment of the present invention. In the example of FIG. 7, the control and drive circuit 64 comprises: a comparator 81, configured to receive the compensation signal CMP and a saw-tooth signal $V_{SAW}$, wherein the saw-tooth signal $V_{SAW}$ increases linearly when the main power switch 32 is ON, and is reset when the main power switch 32 is OFF, and wherein the comparator 81 is configured to generate a comparison signal by comparing the compensation signal CMP with the saw-tooth signal $V_{SAW}$; a maximum off time circuit 84, configured to provide a maximum off time signal $T_{max}$; a logic circuit 82, configured to be set in response to the maximum off time signal $T_{max}$ and a zero crossing signal ZCD indicative of a zero crossing condition (e.g. by way of a third winding, not shown) of a current flowing through the secondary power switch 34, and to be reset in response to the comparison signal, to generate a logic signal; and a drive unit 83, configured to receive the logic signal to generate the control signal Dr, so as to control the operation of the main power switch 32.

In one embodiment, the maximum off time circuit 84 is operable to start timing in response to the OFF status of the main power switch 32, when the timing reaches a maximum time length, the maximum off time signal $T_{max}$ is generated.

In the example of FIG. 7, the logic circuit 82 comprises a RS flip-flop.

In the example of FIG. 7, the control and drive circuit 64 further comprises: a logical OR unit 85, configuration to execute a logical OR operation on the zero crossing signal ZCD and the maximum off time signal $T_{max}$, wherein the logic circuit 82 is set in response to the operation result of the logical OR unit 85.

As discussed above, if one of the channels is short, the short status would be locked; or if both channels are short, one of the channels would be locked. Then the current flowing through the secondary winding won't fall to zero in a long time period. If the current flowing through the secondary winding has not crossed zero after the maximum off time period, the maximum off time signal $T_{max}$ is generated by the maximum off time circuit 84. Accordingly, the logical signal is set, which turns on the main power switch 32, and a new switching cycle starts.

Figure 8:
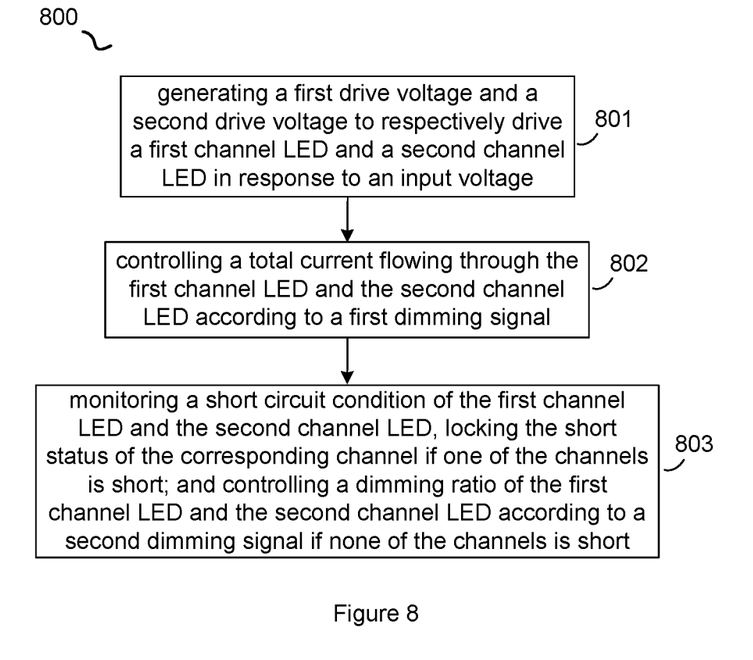
FIG. 8 schematically shows a flowchart 800 of a short circuit protection method for a two-channel LED driver in accordance with an embodiment of the present invention.

The present invention further provides a short circuit protection method for a two-channel LED driver. FIG. 8 schematically shows a flowchart 800 of a short circuit protection method for a two-channel LED driver in accordance with an embodiment of the present invention. The method comprises:

Step 801, generating a first drive voltage and a second drive voltage to respectively drive a first channel LED and a second channel LED in response to an input voltage.

Step 802, controlling a total current flowing through the first channel LED and the second channel LED according to a first dimming signal. And Step 803, monitoring a short circuit condition of the first channel LED and the second channel LED, locking the short status of the corresponding channel if one of the channels is short; and controlling a dimming ratio of the first channel LED and the second channel LED according to a second dimming signal if none of the channels is short.

In one embodiment, the method further comprises synchronizing the second dimming signal with the input voltage.

In one embodiment, locking the short status of the corresponding channel if one of the channels is short comprises: series coupling a first dimming switch to the first channel LED; series coupling a second dimming switch to the second channel LED; and keeping the corresponding dimming to be ON if the corresponding channel LED is short.

In one embodiment, monitoring a short circuit condition of the first channel LED and the second channel LED comprises: coupling a first drive signal to a control signal by way of a first diode; and coupling a second drive signal to the control signal by way of a second diode; wherein the control signal is operable to control a first dimming switch series coupled to the first channel LED and a second dimming switch series coupled to the second channel LED.

In one embodiment, the method further comprises: inverting the second dimming signal to generate an inverted signal, wherein the dimming ratio of the first channel LED and the second channel LED is controlled by the inverted signal.

In one embodiment, if both of the two channels are short, locking the short status of one of the channels.

In one embodiment, the short status is locked to trigger short circuit protection.

Several embodiments of the foregoing two-channel LED drivers and the short circuit protection method provide good protection to the system. If one or two channels are short, the short status is locked in time, so as to shut down the whole system; or a maximum off time circuit is adopt, to restart the power converter and provide a small power if short circuit condition lasts for a long time.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A two-channel LED driver, comprising:
   a power converter, configured to provide a first drive voltage and a second drive voltage, to respectively drive a first channel LED and a second channel LED in response to an input voltage, the power converter including a main power switch, the first channel LED being dimmed by a first dimming switch, the second channel LED being dimmed by a second dimming switch, the first dimming switch and the second dimming switch being both controlled by a second dimming signal, and the second dimming switch being controlled to be turned on and off complementary with the first dimming switch;
   a power control circuit, configured to generate a control signal to control the main power switch in response to a first dimming signal and a current sense signal indicative of a current flowing through the main power switch; and
   a short process circuit, configured to monitor a short condition of the first channel LED and the second channel LED, wherein if one of the channels is shorted, the short process circuit is configured to control the corresponding dimming switch of the shorted channel LED to be kept ON.

2. The two-channel LED driver of claim 1, wherein if both of the channels are short, the short process circuit is configured to control one of the dimming switch to be kept on.

3. The two-channel LED driver of claim 1, wherein the short process circuit comprises:
   a first comparing circuit, configured to compare a first voltage signal indicative of the first drive voltage with a zero reference voltage, when the first voltage signal is lower than the zero reference voltage, a first connect switch is turned on to pull high a control signal of the first dimming switch; and
   a second comparing circuit, configured to compare a second voltage signal indicative of the second drive voltage and the zero reference voltage, when the second voltage signal is lower than the zero reference voltage, a second connect switch is turned on to pull low the control signal of the first dimming switch.

4. The two-channel LED driver of claim 1, further comprising:
   a photoelectric coupler, wherein the second dimming signal is inverted as an inverted signal by way of the photoelectric coupler, and wherein the inverted signal is used to control the ON and OFF of the first and second dimming switches.

5. The two-channel LED driver of claim 4, wherein the photoelectric coupler includes a light emitting diode part and a triode part, and wherein:
   the light emitting diode part is configured to receive the second dimming signal; and
   the triode part is configured to provide the inverted signal.

6. The two-channel LED driver of claim 5, wherein the short process circuit comprises:
   a grounding switch, wherein a first terminal of the triode part is coupled to a reference ground by way of the grounding switch;
   a first diode, wherein a second terminal of the triode part is configured to receive one of the drive voltages by way of the first diode; and
   a second diode, wherein the other one of the drive voltages is configured to control the grounding switch by way of the second diode.

7. The two-channel LED driver of claim 1, wherein the power control circuit comprises:
   an output current calculator, configured to calculate a total current flowing through the first channel LED and the second channel LED based on the current sense signal, to generate an equivalent output current;
   a reference signal generator, configured to generate a reference signal controlled by the first dimming signal;
   an error amplifier, configured to generate a compensation signal by amplifying and integrating a difference between the reference signal and the equivalent output current; and
   a control and drive circuit, configured to generate a control signal in response to the compensation signal to control the main power switch.

8. The two-channel LED driver of claim 7, wherein the power converter further includes a first winding, a secondary winding magnetically coupled to the first winding, and a secondary power switch coupled to the secondary winding, and wherein the control and drive circuit comprises:
   a comparator, configured to receive the compensation signal and a saw-tooth signal, wherein the saw-tooth signal increases linearly when the main power switch is ON, and is reset when the main power switch is OFF, and wherein the comparator is configured to generate a comparison signal by comparing the saw-tooth signal with the compensation signal;
   a maximum off time circuit, configured to provide a maximum off time signal;
   a logic circuit, configured to be set in response to the maximum off time signal and a zero crossing signal indicative of a zero crossing condition of a current flowing through the secondary power switch, and to be reset in response to the comparison signal, to generate a logic signal; and
   a drive unit, configured to receive the logic signal to generate the control signal, so as to control the operation of the main power switch.

9. The two-channel LED driver of claim 1, wherein:
   the short process circuit is configured to monitor the short circuit condition based on the first drive voltage and the second drive voltage.

10. A short circuit protection method for a two-channel LED driver, comprising:
    generating a first drive voltage and a second drive voltage to respectively drive a first channel LED and a second channel LED in response to an input voltage;
    controlling a total current flowing through the first channel LED and the second channel LED according to a first dimming signal; and
    monitoring a short circuit condition of the first channel LED and the second channel LED: 1) locking the short status of the corresponding channel if one of the channels is short; and 2) controlling a dimming ratio of the first channel LED and the second channel LED according to a second dimming signal if none of the channels is short.

11. The LED drive method of claim 10, monitoring a short circuit condition of the first channel LED and the second channel LED comprises:

coupling a first drive signal to a control signal by way of a first diode; and coupling a second drive signal to the control signal by way of a second diode; wherein the control signal is operable to control a first dimming switch series coupled to the first channel LED and a second dimming switch series coupled to the second channel LED.

12. The short circuit protection method of claim 10, wherein locking the short status of the corresponding channel if one of the channels is short comprises:
series coupling a first dimming switch to the first channel LED;
series coupling a second dimming switch to the second channel LED; and
keeping the corresponding dimming to be ON if the corresponding channel LED is short.

13. The short circuit protection method of claim 10, wherein:
if both of the two channels are short, locking the short status of one of the channels.

14. The short circuit protection method of claim 10, further comprising:
synchronizing the second dimming signal with the input voltage.

15. A two-channel LED driver, comprising:
a power converter, configured to provide a first drive voltage and a second drive voltage, to respectively drive a first channel LED and a second channel LED in response to an input voltage, the power converter including a main power switch;
a power control circuit, configured to generate a control signal to control the main power switch in response to a first dimming signal and a current sense signal indicative of a current flowing through the main power switch; and
a short process circuit, configured to monitor a short condition of the first channel LED and the second channel LED, wherein if one of the channels is shorted, the short process circuit is configured to lock the short status of the shorted channel LED.

16. The two-channel LED driver of claim 15, wherein if both of the channels are short, the short process circuit is configured to lock the short status of one of the channels.

17. The two-channel LED driver of claim 15, wherein:
the short process circuit is configured to monitor the short circuit condition based on the first drive voltage and the second drive voltage.

18. The two-channel LED driver of claim 15, wherein:
the first channel LED is dimmed by a first dimming switch;
the second channel LED is dimmed by a second dimming switch;
the second dimming switch being controlled to be turned on and off complementary with the first dimming switch; and
the short status of the shorted channel LED is locked by keeping the corresponding dimming switch of the shorted channel LED to be ON.

19. The two-channel LED driver of claim 18, wherein the short process circuit comprises:
a first diode, configured to receive one of the drive voltages, and to pull low a control signal if the drive voltage received at the first diode is low; and
a second diode, configured to receive the other one of the drive voltages, and to pull high the control signal if the drive voltage received at the second diode is low; wherein the first dimming switch and the second dimming switch is controlled by the control signal.

20. The two-channel LED driver of claim 15, wherein the short process circuit comprises:
a first comparing circuit, configured to compare a first voltage signal indicative of the first drive voltage with a zero reference voltage, when the first voltage signal is lower than the zero reference voltage, a first connect switch is turned on to pull high a control signal of the first dimming switch; and
a second comparing circuit, configured to compare a second voltage signal indicative of the second drive voltage and the zero reference voltage, when the second voltage signal is lower than the zero reference voltage, a second connect switch is turned on to pull low the control signal of the first dimming switch.

* * * * *